June 16, 1931. B. F. C. MORRIS 1,810,782
CHICK FEEDER
Filed Sept. 14, 1928
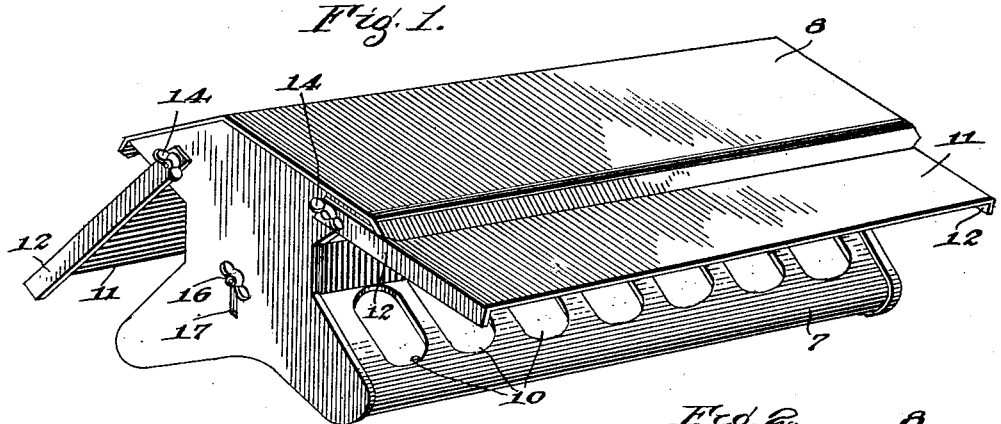
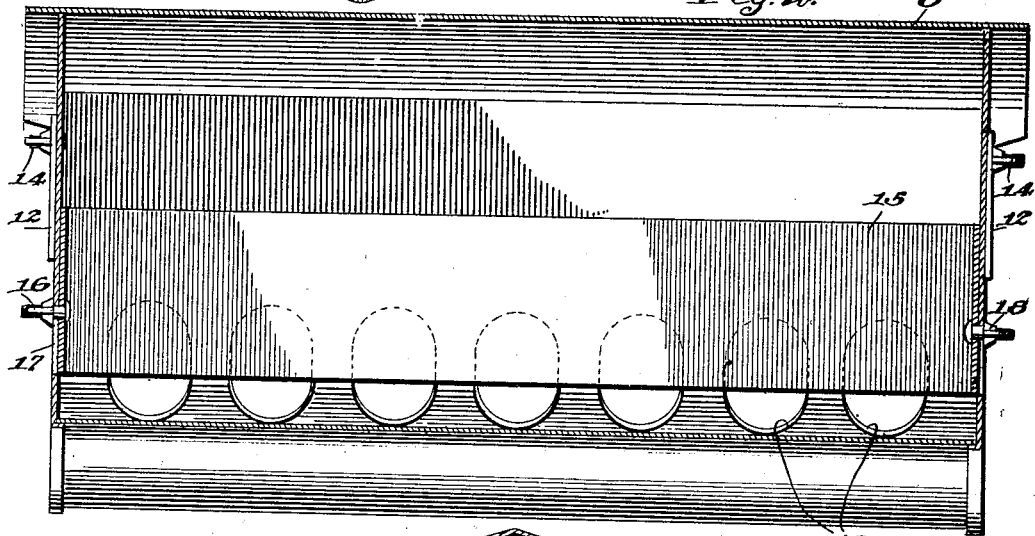
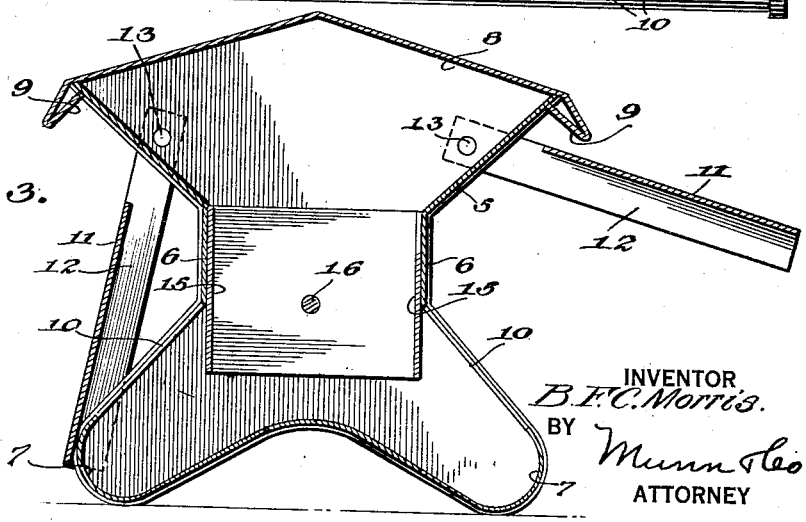

Patented June 16, 1931

1,810,782

UNITED STATES PATENT OFFICE

B FREDERICK C. MORRIS, OF EL RENO, OKLAHOMA

CHICK FEEDER

Application filed September 14, 1928. Serial No. 306,028.

My invention relates to chick feeders and has as one of its objects the provision of a chick feeder having adjustable wings which preclude larger chicks, or mature chickens from gaining access to the feed, and when desired, will function as closures.

The invention further contemplates a chick feeder embodying a hopper having divergent troughs, and a vertically adjustable slide for governing the flow of feed into the troughs.

With the preceding and other objects and advantages in mind, the invention consists in the novel combination of elements, construction and arrangement of parts to be hereinafter specifically referred to, claimed and illustrated in the accompanying drawings, wherein:—

Figure 1 is a perspective of my invention with one of the wings in its full raised position, and its other wing in partially lowered position, Figure 2 is a vertical longitudinal sectional view of the same, and Figure 3 is a vertical transverse section of the invention illustrating one of the wings in position to close one of the troughs.

Referring to the invention in detail, an elongated sheet metal hopper is provided having divergent side walls 5, intermediate vertical parallel walls 6, and a pair of divergent rounded troughs 7, whose bottoms are inclined in opposite directions. An inverted V-shaped top 8 overlies the divergent side walls and is slidably associated therewith by means of inwardly directed angularly disposed flanges 9 formed with the longitudinal edges of the top and contacting with the outer faces of the divergent walls.

Access to the feed contained in the troughs by chicks is had through longitudinally alined elongated openings 10 formed in the upper walls of the troughs.

Extending from opposite sides of the hopper and overlying the openings 10 is a pair of wings or plates 11 terminating in right angular flanges 12 at their ends. These flanges 12 extend beyond the inner longitudinal edges of the wings and are pivotally mounted on laterally projecting bolts 13 fixed to and extending from the end walls of the hopper. Wing nuts 14 are threaded on these bolts to bindingly engage the flanges to hold the wings in the positions illustrated in Figs. 1 and 3.

In practice the wings may be adjusted to either of the angular positions illustrated in Fig. 1 to act as guards to prevent larger chicks or mature chickens from gaining access to the feed contained in the troughs.

In order to regulate the flow of feed into the troughs 7 a vertically adjustable sheet metal rectangular members 15 is provided. As illustrated in Figure 3, the parallel walls of this rectangular member extend along the vertical walls 6 and project into the troughs. The end walls of this rectangular member lie against the inner faces of the end walls of the hopper, and carry laterally projecting screws 16 which pass through vertical slots 17 provided in the hopper end walls. Wing nuts 19 are threadedly engaged with the screws, and are engageable with the hopper end walls to retain the rectangular member in desired adjustment.

In practice, the hopper is filled with feed from the top and gravitates into the troughs 7, so that as it is consumed these troughs will be continuously replenished. It will be apparent that the flow of feed to the troughs may be governed by adjusting the rectangular member vertically with respect to the hoppers.

Due to its durable construction, the feeder is particularly adapted to outdoor use. Moreover, by increasing the width of the flanges 12, the feeder will be entirely closed at its ends when the wings or plates are in the position disclosed in Fig. 3. It will be therefore apparent that the device is rodent proof as well as weather proof.

What is claimed is:

In a chick feeder, a hopper, a laterally disposed longitudinally extending trough below the same, a plate arranged to one side of the hopper having parallel flanges at its ends and projecting beyond the inner edge of the plate and overlying the hopper end walls, fixed laterally projecting threaded elements carried by the hopper end walls and pivotally receiving the flanges, and nuts coacting with the threaded elements in maintaining the plate in predetermined angular positions above the hopper, the plate being capable of being swung to a substantially vertical position to close the hopper.

B FREDERICK C. MORRIS.